D. PHILIPS.
Wagon Brake
No. 79,855.
Patented July 14, 1868.
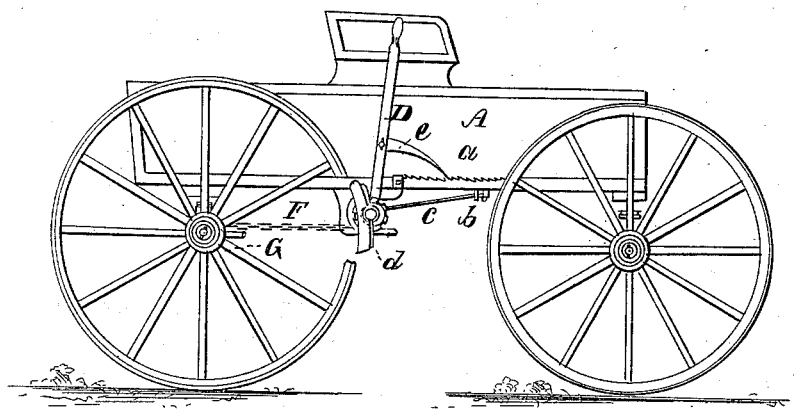
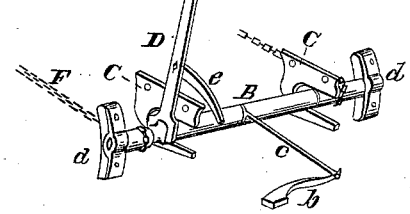
Witnesses
L. Hailer
P. T. Dodge
Inventor, D. Philips
by Dodge&Munn
his atty.

United States Patent Office.

DAVID PHILIPS, OF CORDOVA, ILLINOIS.

Letters Patent No. 79,855, dated July 14, 1868.

IMPROVED WAGON-BRAKE.

*The Schedule referred to in these Letters Patent and making part of the same.*

TO ALL WHOM IT MAY CONCERN:

Be it known that I, DAVID PHILIPS, of Cordova, in the county of Rock Island, and State of Illinois, have invented certain new and useful Improvements in Wagon-Brake; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

In the drawings—

Figure 1 is a side elevation of a wagon with my brake applied.

Figure 2 is a perspective view of my brake detached, with the parts in the same relative position as when attached.

My brake is intended for application to ordinary wagons or other wheeled vehicles, and so constructed as to be very simple but powerful in its operation, and so arranged that it may be readily detached when desired.

In constructing it, I provide a wooden bar, B, of a length equal to or little more than the gauge of the wagon. This bar should be round in shape, and has a journal formed on each end.

On these journals I mount or secure rub-blocks, $d$, which are heavier at one end than the other, so as to always hang perpendicular and the same end up.

At the proper distance from the end of bar B, I rigidly secure a handle, D, as shown in fig. 2.

This bar B, with its handle and rub-blocks, I attach to the under side and crossways of the body of the wagon, just forward of the rear wheels, by means of cast-iron supports or brackets, C, bolted one to each side of the wagon-body. These supports have an elongated opening extending from their front end back to near their rear, and of the proper width to receive the bar B, it being round at the point that enters these supports, so as to form a journal, and bears against the metal at the back end of the openings in support C, the rear end of said opening being made semicircular. When the bar B is thus placed in position, the rub-blocks will come opposite the tire of the wheels G, and is free to slide to or from the wheel in said supports C, and carry the rub-blocks with it.

To the bar B at each end, and outside of the line of the body of the wagon, I attach a chain, F, which passes back and is attached to either the rear axle or the wagon-body, by a metal hook, this chain being used to draw the blocks against the wheels.

When the brake is to be applied, the handle D is seized (it projecting up by the side of the body as in fig. 1) and drawn backwards, when the chain F will be wound around B, and as the chain is fixed at its rear end, the blocks will be drawn tightly against the wheels, the handle D being held back by a pawl, $e$, pivoted to it, and working in a ratchet-plate, $a$, secured to the body of the wagon, as shown in fig. 1.

For the purpose of drawing the blocks forward, away from the wheels, when the handle is released, there is secured to the under side of the body, forward of the bar, a spring, $b$, connected to the bar by a cord, $c$, as clearly shown in fig. 2, which may be used instead of a chain or rod, and may wind around the bar when it turns, or not.

It is obvious that instead of the chain F, a cord may be used, or an iron rod with a few links on the end next to the bar, and that a spiral spring may be used instead of a flat one, $b$.

When great power is required, an auxiliary lever may be attached on the other end of the bar, which will be much longer than D, and made detachable; and either of these levers may have a rope attached to its upper end, so that the brake may be operated from the ground.

The rub-blocks may be fastened to the bar in any suitable manner, as by a washer and pin, on the outside, passing through the bar.

The chains may be provided with a swivel-screw, so as to alter their lengths, so as to equalize the pressure on the wheels; this, however, not being considered essential.

When it is desired to detach the brake for any reason, the lever is allowed to fall forward, thus unwinding chain F, which is then unhooked at its rear end. The cord c is unfastened from the spring, and the brake is slipped out of the supports, and is laid aside until required for use.

Or if it be desired to use it on a hay or wood-rack, it can be readily applied by simply detaching the supports C and securing them to the side bars of the rack, or the rack may be supplied with extra supports, so as to save the necessity of changing the latter from one to the other, which is better still.

Having thus fully described my invention, what I claim, is—

The brake, consisting of the roller-bar B, having the blocks $d$ pivoted thereon, with the lever D, supports C, and chains F, when said parts are constructed and arranged to operate substantially as described.

DAVID PHILIPS.

Witnesses:
W. L. CARROLL,
J. M. DANIELS.